Dec. 16, 1969   B. L. TIEP   3,483,861
APPARATUS FOR MEASURING RESPIRATION
Filed Nov. 21, 1966   3 Sheets-Sheet 3

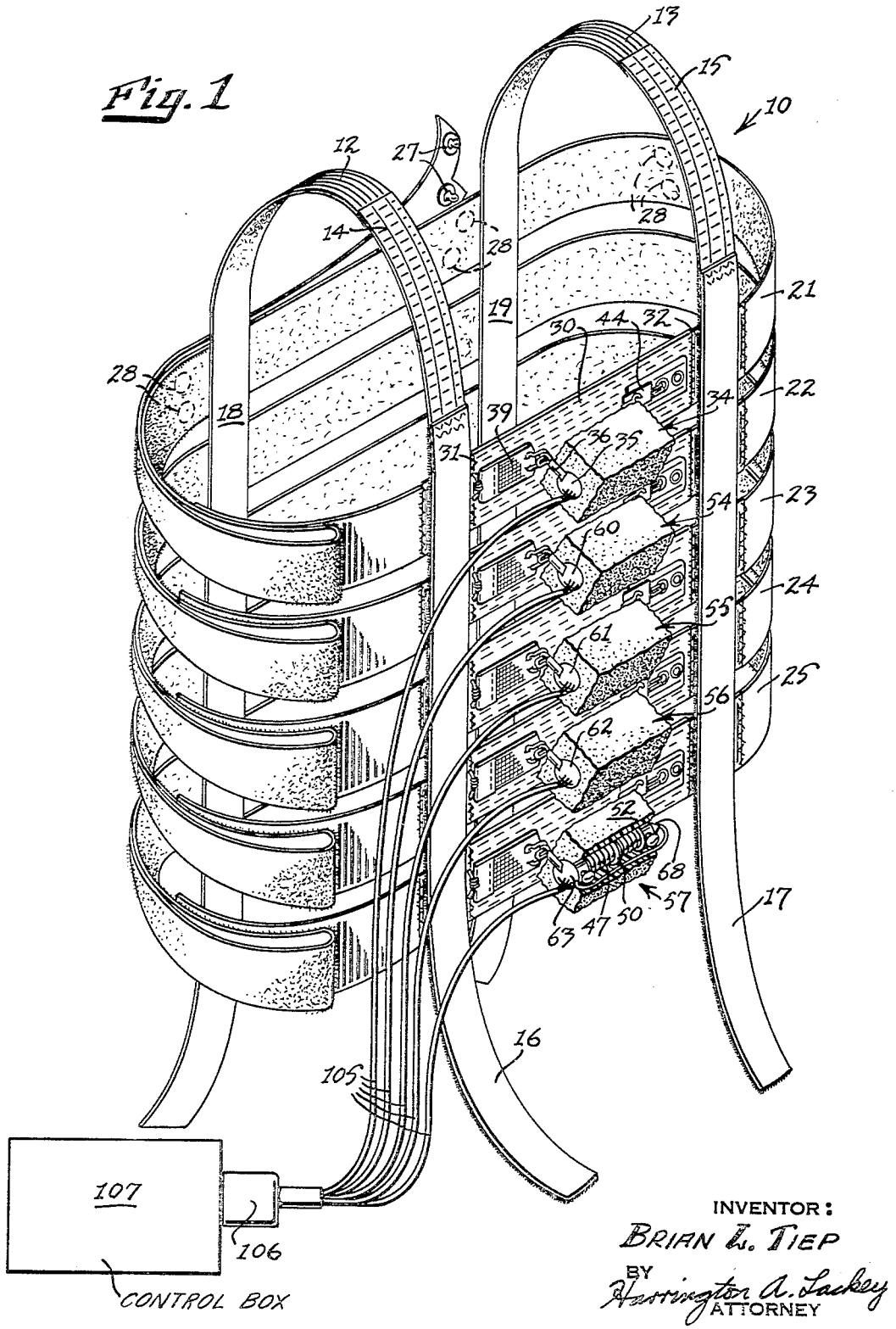

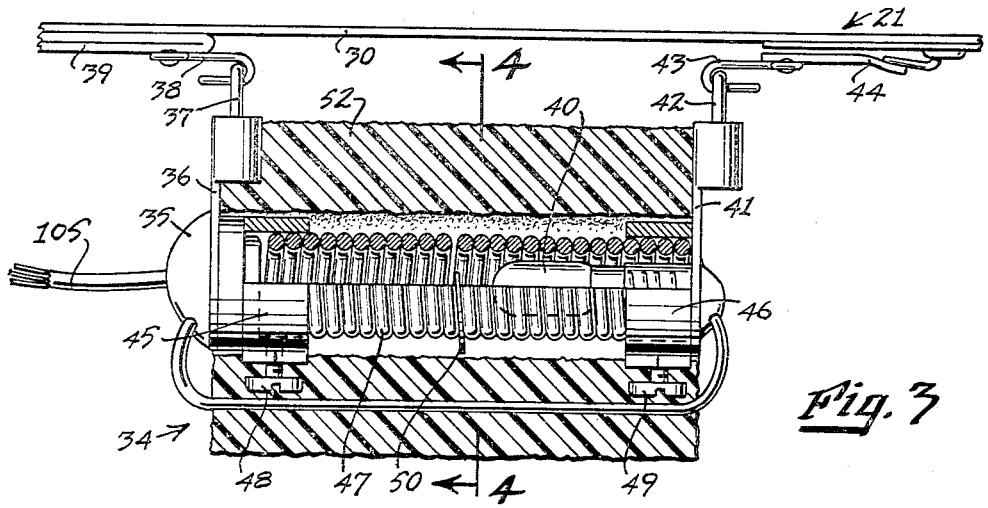
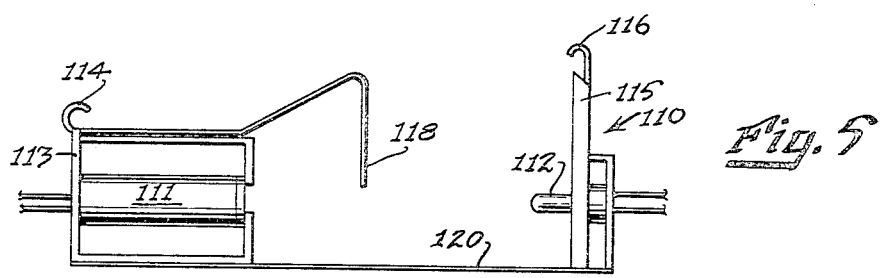
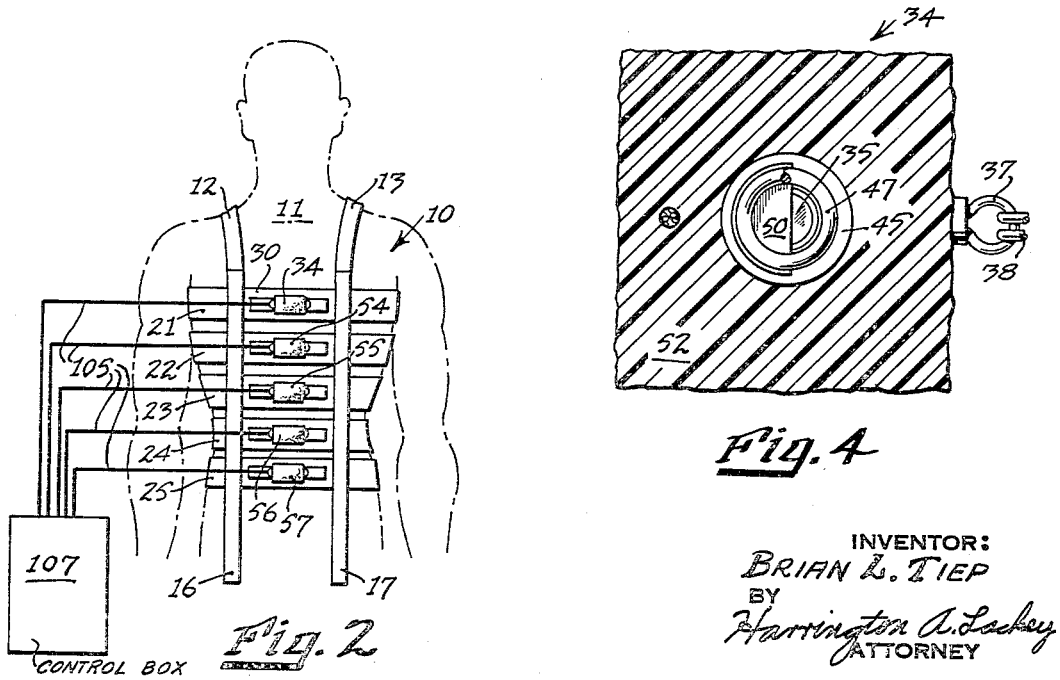

INVENTOR:
BRIAN L. TIEP
BY Harrington A. Lackey
ATTORNEY

United States Patent Office 3,483,861
Patented Dec. 16, 1969

3,483,861
APPARATUS FOR MEASURING RESPIRATION
Brian L. Tiep, 1225 17th Ave. S.,
Nashville, Tenn. 37212
Filed Nov. 21, 1966, Ser. No. 595,801
Int. Cl. A61b *5/08;* A61m *16/00;* G01d *5/34*
U.S. Cl. 128—2.08                                        5 Claims

ABSTRACT OF THE DISCLOSURE

An apparatus for measuring and recording respiration over the full trunk or torso of a person and primarily at three different levels of respiration, namely, the thoracic, the diaphragmatic and the abdominal levels. A vest is fitted to the full torso of the person and includes a plurality of transducers for measuring the corresponding circumferent principles. A spirograph is used to monitor volumet- and an electrical circuit and recording device records the rate, amplitude and phase relation of the respiration at the different levels.

BACKGROUND OF THE INVENTION

This invention relates to the field of measurement of respiration, and more specifically to a vest pneumograph.

Heretofore, there have been several varieties of apparatus for measuring respiration which operate on different principles. A spirograph is used to monitor volumetric air exchange and its chemical components. The breath holding capacity is measured by means of the Flack Test in which the subject blows as long as possible into a mercury manometer. The total body plethysmograph measures volume exchange but requires the subject to be confined to a chamber for the duration of the test. The impedence pneumograph, which provides a good indirect volume change measure, is much less cumbersome to the subject than the above methods, but requires consistent electrode placement and contact and causes lesions to the skin where silver electrodes are frequently employed. The single chest expansion strap is only of value as an over-all measurement of rate and of chest expansion at the level of placement. As for muscle response behavior, the electromyograph would seem to be the optimal system, but the multiple electrode placement necessary to fulfill the requirements of such a method is physically and biologically impractical, and the data obtained do not correlate well with volume change.

SUMMARY OF THE INVENTION

This invention is directed to the measurement of the total respiration of a person or patient by measuring and recording the circumferential expansion of the torso at the primary levels of respiration, namely the thoracic, diaphragmatic and abdominal levels, so that the various respirational levels may be compared. This measurement is accomplished by a vest adapted to comfortably fit and engage the entire torso including the three primary levels of respiration. The vest is constructed of a plurality of discrete transverse straps, each strap supporting a transducer capable of detecting and converting to a corresponding electrical signal the transverse circumferential expansion of the torso at the specific level of the strap and corresponding transducer. One or more transducers and corresponding straps may be placed at each level. This signal from each transducer is then integrated, amplified and recorded for each of the primary levels. Thus, the amplitude, rate and phase relation of the respiration for each level of breathing for each patient may be readily compared and analyzed.

Each transducer is constructed to convert the increment of linear expansion to which it is subjected by the circumferential expansion of the torso at its corresponding location into a corresponding electrical signal. Each transducer employed in this invention incorporates a photosensitive element and a light source whose angular relation is changed by the mechanical linear expansion in order to vary the amount of light received by the photosensitive element.

BRIEF DESCRIPTION OF THE DRAWING

FIG. 1 is a front perspective view of the vest made in accordance with this invention with one of the transducer casings broken away;

FIG. 2 is a front schematic view showing the vest mounted on a patient;

FIG. 3 is an enlarged fragmentary plan view of a portion of the vest disclosing a transducer in section;

FIG. 4 is a section taken along the line 4—4 of FIG. 3;

FIG. 5 is a section similar to FIG. 3 showing a modified form of transducer;

DESCRIPTION OF THE PREFERRED EMBODIMENTS

Figure 7:
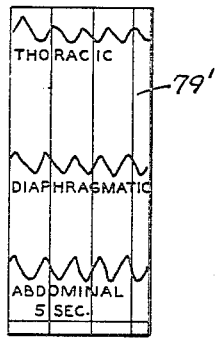
FIG. 7 discloses a polygraph record of respiration of a normal nine-year-old male produced by the apparatus made in accordance with this invention.

Referring now to the drawings in more detail, FIGS. 1 and 2 disclose the vest 10 adapted to fit the torso 11 of a person. The vest 10 includes a pair of shoulder straps 12 and 13 which may have elastic sections 14 and 15, if desired. The shoulder straps 12 and 13 also comprise respective front sections 16 and 17 and rear sections 18 and 19 which extend the full height of the torso. The non-elastic portions of the straps 12 and 13, including the front and rear sections 16–19 are preferably made of the self-adhesive material known as Velcro fabric.

Secured to the soulder straps 12 and 13 and extending transversely thereof to completely surround or circumvent the torso 11 in assembled position are a plurality of torso straps 21, 22, 23, 24 and 25. Each of the torso straps 21–25 is also preferably made of Velcro fabric so that each torso strap may be readily and detachably secured to the shoulder straps 12 and 13 at various elevated positions. Moreover, each of the straps 21–25 is sufficiently long to overlap itself, as disclosed in FIG. 1, in order to accommodate the various circumferential dimensions of the torsos 11 of different patients, both male and female. Snap fasteners, such as 27 and 28 may be fixed at spaced intervals along each of the torso straps, such as the top strap 21, in order to secure the overlapping ends of the respective straps.

As disclosed in FIG. 1, each torso strap 21–25 may include a front elastic section, such as 30 yieldably connecting the opposed but separated end portions 31 and 32.

Also secured to the separated ends 31 and 32 of the top strap 21 is the top transducer 34. At one end of the transducer 34 (FIG. 3) is a photosensitive element, such as photocell 35, fixed to the outer ends of an arm 36. The inner end of the arm 36 comprises a loop 37 engaged by a hook or clasp 38 fixed to one end of an elastic flap 39, the opposite end of which is coupled or linked to the end of the strap 31.

At the opposite end of the transducer 34 is a light source, such as lamp 40, mounted at the outer end of lever arm 41. The inner end of the lever arm 41 is also provided with loop 42 engaged by a hook or clasp 43 fixed to one end of an elastic flap 44, the opposite end of which is detachably and adjustably connected to the elastic section 30 and the strap end 32.

Surrounding each of the photocell 35 and the lamp 40 and fixed to the respective outer ends of the arms 36 and 41 are opposed spring wells 45 and 46 receiving opposite ends of a coil spring 47. The opposite ends of the spring 47 may be secured in the opposing spring wells 45 and 46 by set screws 48 and 49, if desired.

When the transducer 34 is in its normal inoperative position, coil spring 47 is substantially straight, with the light beam emitted from the lamp 40 directed coaxially of the coil spring 47 toward the photocell 35. Thus, when the ends 31 and 32 of the strap 21 are moved further apart by the patient inhaling to expand his thorax, the inner or looped ends 37 and 42 of the arms 36 and 41 are moved away from each other causing the arms 36 and 41 to diverge and causing the spring 47 to flex concave toward torso strap 21. This respiratory expansion and angular deviation of the arms 36 and 41 also causes an angular deviation between the beam from the light source 40 and the photocell 35. In order to restrict the light beam, a plate or barrier 50 may be inserted between the coils of the spring 47 partially in the normal path of the light beam. As the beam is deflected away from the photocell 35 during the respiratory expansion, part of the beam is also interrupted by the barrier 50. Thus, as the beam of light from lamp 40 increases its deflection away from the photocell 35, electrical signals transmitted by the photocell 35 are proportionately decreased.

The transducer 34 may be encased by a resilient or cushioned housing 52, if desired, such as foam rubber, in order to protect the elements of the transducer.

The flaps 39 and 44 may or may not be of an elastic material, or either may be of an elastic material, depending upon the amount of angular deviation desired in the light beam in the transducer 34.

Transducers 54, 55, 56 and 57 are identical in construction to transducer 34 and connected in their torso straps 22, 23, 24 and 25, respectively, in a similar manner to measure and convert the circumferential expansion of the corresponding localized portion of the torso into a correspondingly proportional electrical signal. Each of the transducers 54-57 includes photocells 60, 61, 62 and 63, respectively, and lamps 65, 66, 67 and 68, respectively.

Figure 6:
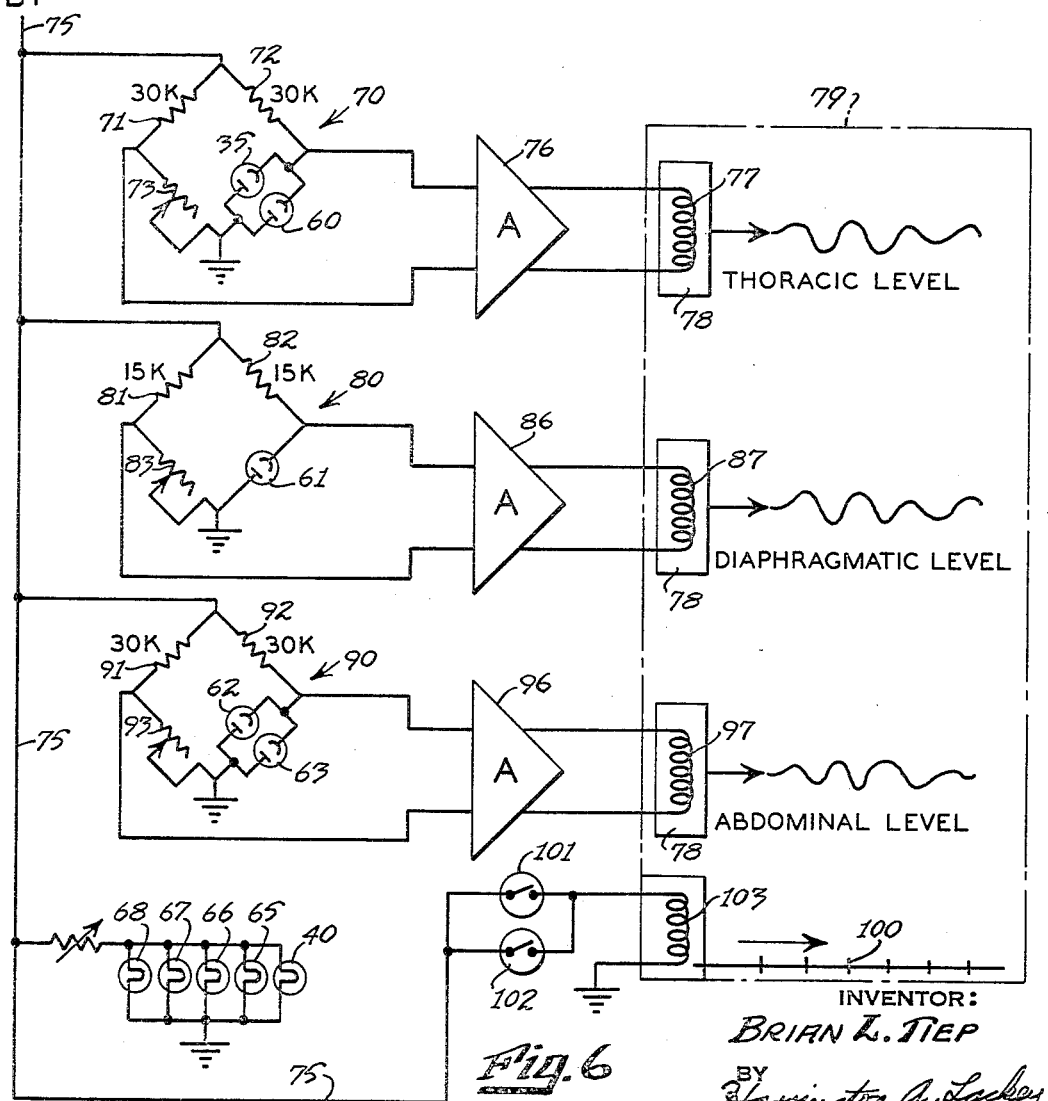
FIG. 6 is a schematic electrical circuit diagram of the invention.

In the circuit diagram of FIG. 6, the photocells 35 and 60 of the two upper transducers 34 and 54 are connected in parallel in one leg of a Wheatstone bridge circuit 70, including fixed resistors 71 and 72 and variable resistor 73. Power is supplied to the bridge circuit 70 from power line 75. The output from the bridge circuit 70 is transmitted to an amplifier 76, such as a Brush amplifier, the output of which is connected to a coil 77 in a conventional recording device such as a polygraph 78 for recording the respiration signals detected by the transducers 34 and 54 at the thoracic level upon a moving sheet of graph paper 79.

In a similar manner, the third or middle transducer 55 has its photocell 61 forming one leg of a bridge circuit 80 including fixed resistors 81 and 82 and a variable resistor 83. The bridge circuit 80 is connected in parallel with the bridge circuit 70 and is also supplied with power from the lead 75. The resultant output of the bridge circuit 80 is transmitted to the amplifier 86 connected to coil 87 of the recording device 78 which inscribes upon the paper 79 the proportionate respiratory signals of the diaphragmatic level.

Likewise, the potocells 62 and 63 are connected in parallel as one leg of the bridge circuit 90 which includes fixed resistors 91 and 92 and variable resistor 93. The bridge circuit 90 is also connected in parallel with the other bridge circuits 70 and 80 and is supplied with power from line 75. The resultant output of the bridge circuit 90 is amplified in the amplifier 96 and fed to the coil 97 of the recording device 78 to register the respiration signals of the abdominal level.

The bottom of the sheet 79 is inscribed periodically with predetermined time marks 100 by means of a timing switch 101. An event marker switch 102 may also be connected in parallel to be manually closed at any time which the operator considers to be a significant event. The event marker coil 103 is also supplied with power from the lead 75.

In order to measure the respiration at the three specific torso levels, thoracic, diphragmatic and abdominal, the transducers 34 and 54 are located at the thoracic level, the transducer 55 is located at the diaphragmatic level, and the transducers 56 and 57 are located at the abdominal level. The location of the transducers thus determines the grouping of the corresponding photocells 35-60, 61 and 62-63 in the three bridge circuits 70, 80 and 90, as shown in FIG. 6.

The lamps 40, 65, 66, 67 and 68 of the corresponding transducers 21-25 are connected in parallel and supplied with power from the power lead 75.

Since each strap 21-25 is discrete and designed to expand independently of any other straps, each transducer 34, 54-57 will measure a different increment of expansion and convert this increment to a corresponding proportional electrical signal. Since the transducers 34 and 54 are grouped and adapted to measure the respiration at the thoracic level, the corresponding photocells 35 and 60 may be connected in parallel and integrate their signals to produce an output from the bridge circuit 70 which will correspond to and accurately reflect the total volume expansion of the torso at the thoracic level. It will be understood that additional transducers may be mounted on correspondingly narrower straps to measure the respiration at the thoracic level and their photocells will also be connected in parallel in the bridge circuit 70 so that their combined electrical signals will be integrated to produce a resultant output which will adequately reflect the respiratory function of the thoracic level.

In a similar manner, other transducers may be located adjacent the middle transducer 55 and their corresponding photocells connected in parallel with the photocell 61 in order to produce an integrated signal corresponding to the total volume expansion of the diaphragm.

Additional transducers may also be located at the abdominal level in the same manner as the additional transducers at the thoracic level to measure the total volume expansion of the abdomen.

As disclosed in FIGS. 1 and 2, the leads from the lamps and photocells for each transducer 34, 54-57 are carried by cables 105 to plug 106 which is detachably secured to control box 107 containing the other electrical elements of the circuit of FIG. 6.

Since the respiration of a person is more or less distinct at the thoracic, diaphragmatic and abdominal levels, representing the respiratory response of the three major muscle groups, the three circuits 70, 80 and 90 have been established to record these three levels of respiration through the recording device 78.

Moreover, since prior attempts to record respiration by a single strap have been woefully inadequate because merely the increase of the transverse area of the torso has been measured, specifically at the level to which the strap has been applied, this invention overcomes this limitation by measuring the total air volume change in the three distinct muscle groups or levels of breathing of the human being. Furthermore, these three levels of respiration are simultaneously recorded so that they can be comparatively studied. Thus, the value of this vest pneumograph over prior devices for measuring respiration, is that it can measure breathing in terms of motor response patterns, and not merely measure isolated volume changes.

It is also within the scope of this invention to connect the output from each of the three bridge circuits 70, 80 and 90 to a single amplifier and recording device so that the total integrated volume change of the torso including all three respiratory levels can be recorded. In short, this invention contemplates measurement of the total volume change rather than a limited localized area measurement in order to more accurately record the respiration or breathing of particular individuals.

FIG. 5 discloses a modification of a transducer 110 including a photocell 111 and a lamp 112. The photocell 111 is mounted on a lever arm 113 having a loop or hooked end 114, which can be engaged by the hook 38 of the flap 39 when substituted for a transducer such as 34. The opposite end of the transducer 110 includes a lever arm 115 having a hook 116 which can be engaged by the hook 43 of the flap 44. The outer ends of the arms 113 and 112 are connected by a yieldable or flexible member, such as a leaf spring 120, which functions in the same manner as the coil spring 47 and may be made of beryllium copper or tempered bronze. An excursion screen or light barrier 118 may be mounted on the photocell 111 or arm 113 to extend partially into the path of the light beam from the lamp 112 in normal position, and to restrict the amount of light transmitted to photocell 111 in a manner somewhat similar to the barrier 50 in the transducer 34 of FIG. 3.

Figure 8:
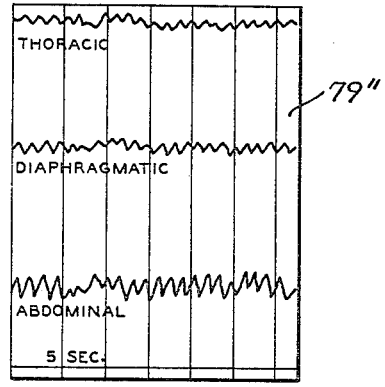
FIG. 8 is another polygraph record of respiration of a ten-year-old asthmatic male.

FIGS. 7 and 8 disclose graphs 79' and 79" recording actual respiratory results at the three principal levels of the torso produced by the vest pneumograph made in accordance with this invention. Graph 79' of FIG. 7 shows the normal respiratory response of a normal nine-year-old boy, while the graph 79" of FIG. 8 shows the quite different respiratory response of a ten-year-old boy suffering from bronchial asthma. By comparison of the graphs 79' and 79" it will be seen that obstructed breathing, such as occurs in the asthmatic boy, produces a lower amplitude and a faster rate of breathing at the thoracic level. Moreover, the amplitude of the abdominal component in the asthmatic male is four or five times greater than the thoracic component for the same individual. Also, the amplitude of the diaphragmatic component is twice that of the thoracic component in the asthmatic individual represented by the graph 79". These and similar graphs have also shown that there is a 90° phase lag of the thoracic component with respect to the abdominal component.

Other studies of males and females reveal that respiration rates appear to be slightly greater in females and that they have shallower respiration at the abdominal level and a greater amplitude at the thoracic level than do males. Thus, from studies of individuals and groups of individuals with the apparatus made in accordance with this invention, definite respiratory characteristics have been determined not only for the different sexes but also for different environment and pathological pulmonary conditions of the individuals and groups.

What is claimed is:

1. An apparatus for measuring respiration comprising:
   (a) a vest adapted to fit the torso of a patient, and to span the full height of the torso including the thoracic, diaphragmatic and abdominal levels,
   (b) said vest comprising at least two discrete thoracic straps, at least one discrete diaphragmatic strap, and at least two discrete abdominal straps,
   (c) each of said discrete straps being arranged to extend transversely of the front of the torso at the corresponding thoracic, diaphragmatic and abdominal levels, said thoracic straps and said abdominal straps being located at different heights in their respective thoracic and diaphragmatic levels,
   (d) each strap comprising first and second separate sections linearly moveable relative to each other with the circumferential expansion of the corresponding portion of said torso,
   (e) a transducer attached to each strap, each transducer comprising a light source and a photosensitive element,
   (f) means connected to said first section and supporting said photosensitive element,
   (g) means connected to said second section and mounting said light source to direct a light beam toward said photosensitive element,
   (h) means coupling said supporting and said mounting means together to permit relative angular movement of said supporting means and mounting means corresponding to the relative linear movement of said first and said second strap sections to vary the path of said light beam relative to said photosensitive element and thereby vary the electrical signal emitted by said transducer,
   (i) electrical recording means, and
   (j) electrical transmitting circuits connecting each of said transducers with said recording means so that said recording means records the respiration characteristics of a patient at each of said thoracic, diaphragmatic and abdominal levels.

2. The invention according to claim 1 in which said coupling means comprises a yieldable elastic member.

3. The invention according to claim 2 in which said elastic member is a coil spring biased to an initial substantially straight position in which said light beam is coaxial of said coil spring, and said photosensitive element and said light source oppose each other at opposite ends of said coil spring.

4. The invention according to claim 2 in which said elastic member is a leaf spring.

5. The invention according to claim 2 in which both said supporting means and said mounting means comprise arms having inner and outer ends, said inner ends being connected to the respective strap sections and said outer ends being connected by said coupling member.

References Cited

UNITED STATES PATENTS

| | | | |
|---|---|---|---|
| 3,159,024 | 12/1964 | Tsien | 250—231 X |
| 3,159,750 | 12/1964 | Kazan | 250—231 |

OTHER REFERENCES

Minner et al., German allowed application, No. 1,124,631, Mar. 1, 1962.

WILLIAM E. KAMM, Primary Examiner

U.S. Cl. X.R.

250—231